United States Patent
Tubb et al.

[11] Patent Number: 6,047,671
[45] Date of Patent: *Apr. 11, 2000

[54] FUEL INJECTION SYSTEM FOR INTERNAL COMBUSTION ENGINES

[75] Inventors: John Howard Tubb, Kingsley; Gavin Warran Dickson, Kallaroo; David James Caley, Sorrento; Paul William Guthrie, Prahran, all of Australia; Oswald Baasch, Cass City, Mich.

[73] Assignee: Orbital Engine Company (Australia) Pty Limited, Balcatta, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/699,574

[22] Filed: Aug. 19, 1996

[30] Foreign Application Priority Data

Aug. 18, 1995 [AU] Australia ............................... PN 4895
Sep. 5, 1995 [AU] Australia ............................... PN 5241

[51] Int. Cl.$^7$ ............................................. F02B 33/04
[52] U.S. Cl. .............................. 123/73 AD; 123/196 M; 123/533; 123/198 A
[58] Field of Search ................... 123/1 A, 73 R, 123/73 AD, 257, 41.77, 27 GE, 526, 527, 531, 533, 196 M

[56] References Cited

U.S. PATENT DOCUMENTS

| | | |
|---|---|---|
| 4,520,773 | 6/1985 | Koslow . |
| 4,671,230 | 6/1987 | Turnipseed . |
| 4,700,671 | 10/1987 | Matsushita ............................ 123/198 R |
| 4,730,580 | 3/1988 | Matsushita ............................ 123/73 AD |
| 4,800,862 | 1/1989 | McKoy et al. ............................ 123/531 |
| 4,920,996 | 5/1990 | Flanner . |
| 4,955,943 | 9/1990 | Hensel et al. ........................ 123/73 AD |
| 4,962,745 | 10/1990 | Ohno et al. ............................... 123/533 |
| 4,977,872 | 12/1990 | Hastopp . |
| 5,009,212 | 4/1991 | Bishai ...................................... 123/533 |
| 5,048,497 | 9/1991 | Kishida et al. .......................... 123/533 |
| 5,074,256 | 12/1991 | Saito ..................................... 123/41.77 |
| 5,085,189 | 2/1992 | Huang et al. ............................ 123/257 |
| 5,119,792 | 6/1992 | Gu ............................................ 123/533 |
| 5,172,865 | 12/1992 | Takano et al. ........................... 123/531 |
| 5,231,969 | 8/1993 | Suga ........................................ 123/1 A |
| 5,360,460 | 11/1994 | Mozdzen et al. . |
| 5,377,637 | 1/1995 | Leighton et al. . |
| 5,472,457 | 12/1995 | Delhomme et al. . |
| 5,533,492 | 7/1996 | Willey et al. ............................ 123/527 |
| 5,546,902 | 8/1996 | Paluch et al. ............................ 123/531 |

FOREIGN PATENT DOCUMENTS 0 425 327A1  5/1991  European Pat. Off. .
2 080 414   2/1982  United Kingdom .

OTHER PUBLICATIONS

Derwent Soviet Inventions Illustrated, Section III, Mechanical & General, Issued Aug. 1964, Engines, Pumps, Boilers, Refrigerators, pp. 1–2.

Patent Abstracts of Japan, M1181, p. 86, JP 3–194164 A, Aug. 23, 1981.

International Publication No. WO83/03120 published Sep. 15, 1983.

*Primary Examiner*—Noah P. Kamen
*Attorney, Agent, or Firm*—Arent Fox Kintner Plotkin & Kahn, PLLC

[57] ABSTRACT

A method of lubricating and cleaning a fuel injector of a fuel injection system of an internal combustion engine during running of the engine including delivering both a lubricant and a cleaning additive to the injector. The injector injects directly into the combustion chamber of the engine. The lubricant and cleaning additive are delivered to the fuel exit area of the injector.

21 Claims, 2 Drawing Sheets

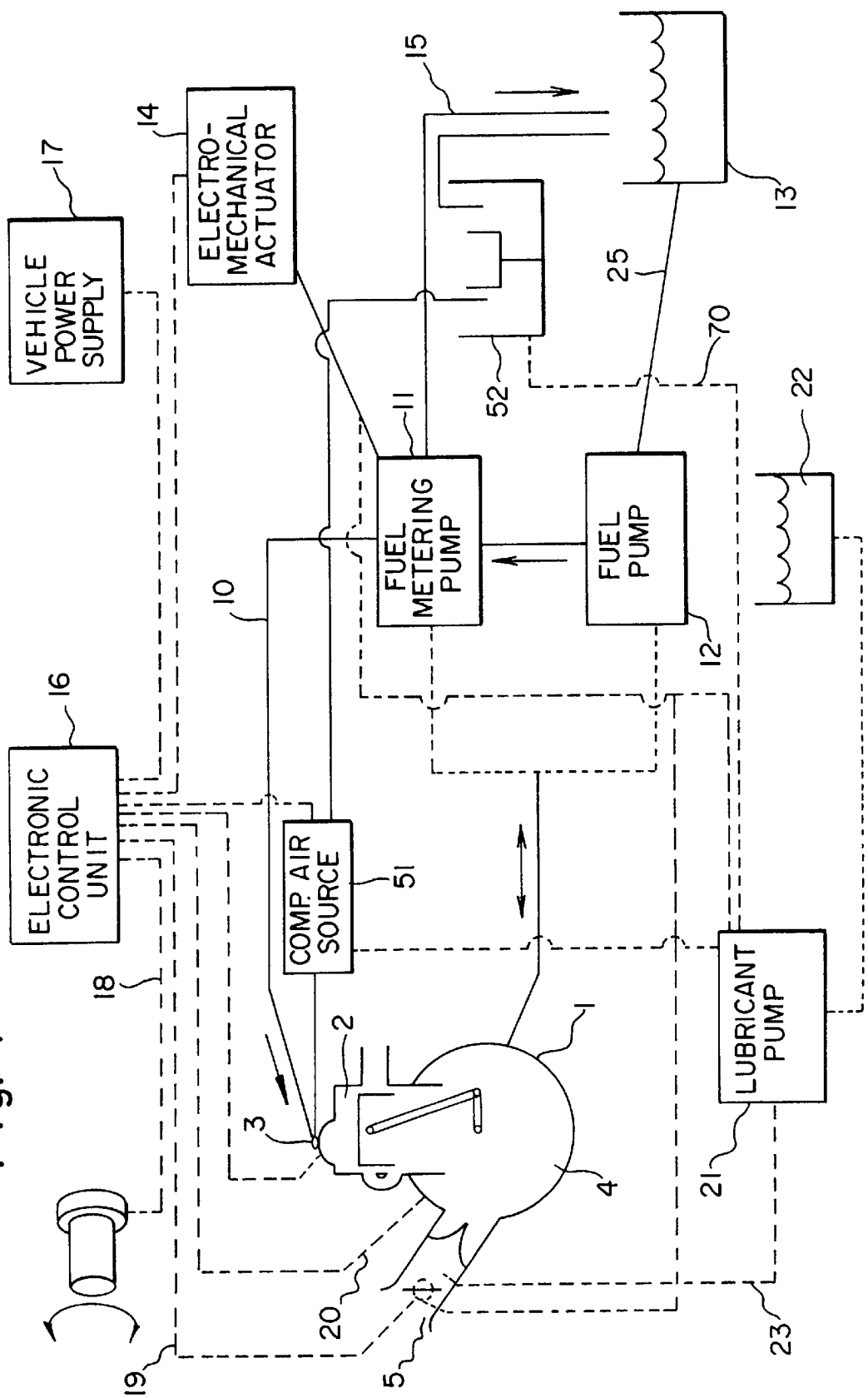

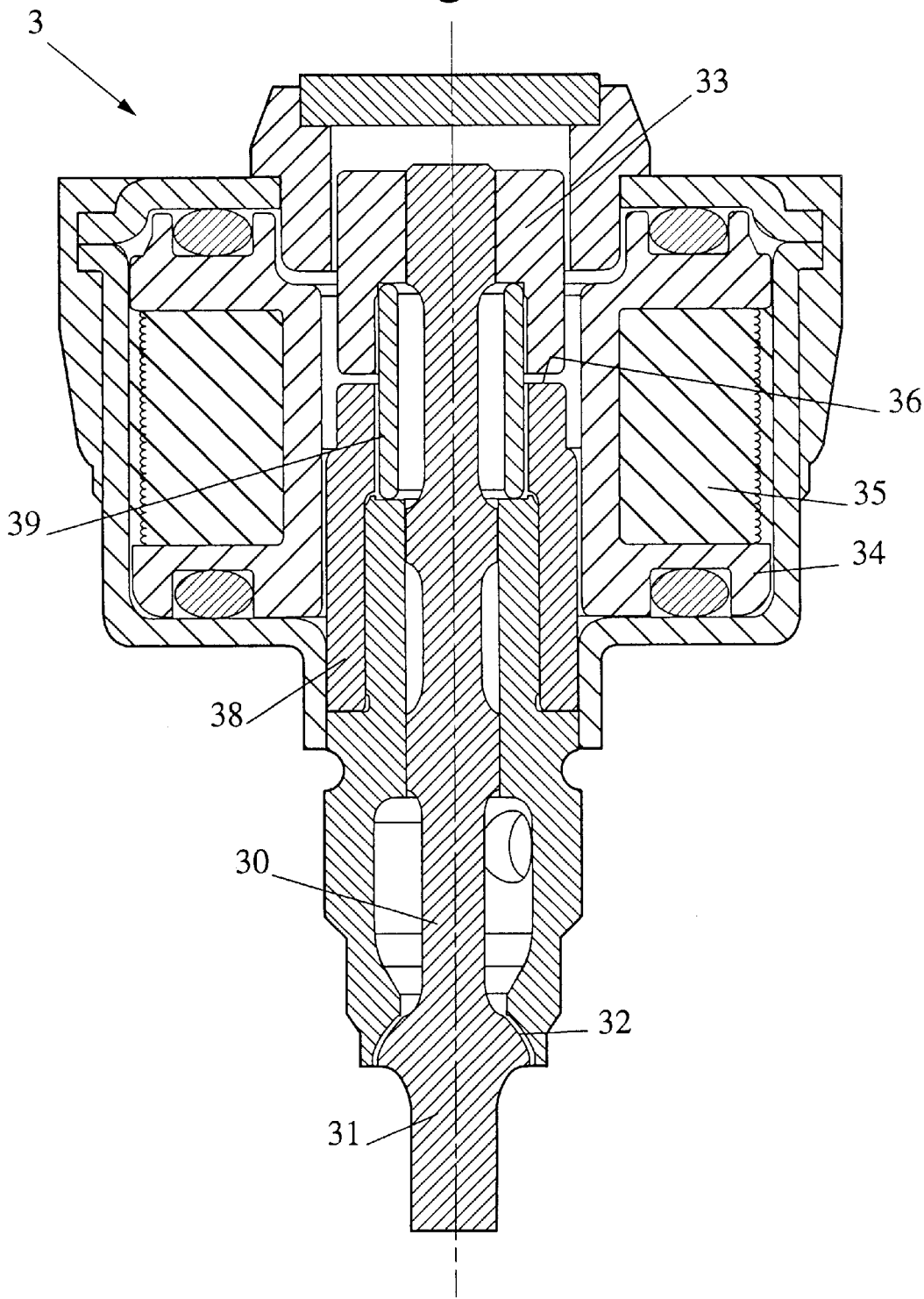

FUEL INJECTION SYSTEM FOR INTERNAL COMBUSTION ENGINES

FIELD OF THE INVENTION

The present invention relates to fuel injection systems for internal combustion engines, The present invention is applicable to small capacity engines and will be described in relation thereto. It is however to be appreciated that the present invention is not restricted to such applications and can also be used in other internal combustion engine applications.

BACKGROUND OF THE INVENTION

The applicant has developed fuel injection systems for two and four stroke internal combustion engines where the delivery of fuel to the engine is effected by means of compressed air. In large capacity engines, the compressed air can be sourced from an air compressor mounted on or near the engine. The cost of providing a separate air compressor is normally however too high for low cost small capacity engines such as small marine engines, motorbike and scooter engines and lawnmower engines. The requirement for a separate air compressor is therefore avoided in the direct injection system described in the applicant's Australian patent application no. 65608/94 wherein compressed gas from the combustion chamber is trapped and stored within an accumulator which is in communication with a fuel delivery injector. This is achieved by keeping the delivery injector open for a predetermined period after the completion of the injection process when the gas pressure in the combustion chamber is generally above that at the time of injection of the fuel into the combustion chamber of the engine. This allows compressed gas (largely air) from the combustion chamber to travel back through the delivery injector into the accumulator wherein the gas is trapped when the delivery injector closes. The trapped compressed gas is then used to assist in the injection of fuel during the next fuel injection event.

It has however been found in small engines using such a fuel injection system that wear may occur on the valve seat of the delivery injector and the portion of the valve member of the delivery injector contacting the valve seat. Furthermore, combustion and other deposits or build-up may form in and around the fuel exit area of the delivery injector due to the various products of combustion contained in the compressed gas which is trapped for the subsequent fuel delivery event and also due to the proximity of the delivery injector fuel exit area to the combustion chamber. These deposits or build-up are typically "carbonaceous" deposits and may include carbon, partial combustion products and deposits, fuel breakdown deposits, gums and varnishes. These aspects are undesirable in that the overall durability and performance of the injector is typically reduced. In particular, the repeatability of satisfactory spray formation from the delivery injector is reduced.

it is considered that one reason for the occurrence of wear at the contact area between the valve seat and the valve member of the delivery injector is that the fuel and gas exiting the delivery injector provides little to no lubrication of that area such that there is direct metal to metal sliding contact as the valve member closes against the valve seat. More generally, wear is likely to be a problem where the final injector is used to meter low lubricity fuels including liquefied petroleum gas (LPG). Further, there is typically a not insignificant metal to metal impact each time the valve member closes against the valve seat.

It is believed that a similar wear problem can also occur when a gaseous fuel is injected by a fuel injection system. Such a gaseous fuel injection system is described in the applicant's Australian patent application no. PN4895 filed on Aug. 18, 1995, details of which are incorporated herein by reference. The gaseous fuel, more so than in the case of a liquid fuel entrained in a gas, is likely to provide little to no lubricating effect at the contact area between the valve member and valve seat resulting in wear at that area.

Indeed, it is apparent that this wear problem is more serious in fuel injection systems delivering gaseous fuel or liquid fuel entrained in a gas, in single fluid injection systems, the valve member typically closes against a volume or head of incompressible liquid. This acts to provide a degree of dampening of the impact of the valve member against the valve seat. However, where gaseous or predominately gaseous fuel is being delivered, the valve member closes against a volume of compressible fluid. There is therefore less of a dampening or arresting effect than would typically be the case in single fluid liquid systems. Nonetheless, such single fluid injection systems are still likely to be susceptible to the carbon deposit formation problems mentioned herein above. Further, wear may still be a problem in such single fluid injection systems, this wear being a factor of the degree of impact within the system versus the viscosity and compressibility of the fluid being injected. The degree of impact within the system is related to the rate and frequency of closing and/or opening of the injector of single fluid system.

Further, it has been observed by the applicant that significant wear may occur on injector valve surfaces in direct injection two-stroke engines and that the use of detergents/ cleaners to control combustion and other deposits may not be effective to prevent injector wear.

Temperature is also known to have some effect on wear and the formation of deposits or build-up. Typically, once temperature has increased to a certain first level, the tendency for deposits or build-up to occur increases as fuel breakdown is encouraged, Further temperature increase beyond this first level generally results in the removal or burning-off of these deposits. However, at these temperatures, the wear resistant properties of the injector material are compromised. Further temperature increases typically further compromise the integrity of the injector material and hence its resistance to wear. Also, as temperature increases, there is typically a corresponding decrease in the hydrodynamic dampening affect provided by the fuel being delivered by the injector. Lubricants such as oil however are typically comparably less effected in regard to this dampening affect by temperature increases.

It is therefore an object of the present invention to avoid at least one of the above problems.

SUMMARY OF THE INVENTION

With this in mind, the present invention provides a method of lubricating and cleaning a fuel injector of a fuel injection system of an internal combustion engine during running of the engine including delivering both a lubricant and a cleaning additive to the injector.

The supply of lubricant to the fuel injector helps to prevent significant wear occurring therein. The supply of the cleaning additive assists to prevent and remove the formation of combustion and other deposits or build-up within the fuel injector, particularly proximate to the valve seat.

The current state of the art in respect of the lubrication of direct injected two stroke engines is that lubricant is typically supplied directly to the engine crankcase. It is not necessary or indeed desired to mix lubricant with the fuel as this will generally lead to increased lubricant consumption and could result in increased emissions from the engine. The present invention however seeks to provide lubrication and cleaning directly to the fuel injectors of an engine and in certain embodiments, contrary to the current state of the art, adds lubricant and/or cleaning additive into the fuel upstream of the fuel injector due to the benefits which can be had therefrom.

The lubricant and the cleaning additive may preferably be added to the fuel upstream of the injector. To this end, the lubricant and the cleaning additive may be delivered at or near an inlet of a fuel pump supplying fuel to the injector. Alternatively, the lubricant and the cleaning additive may be delivered directly to the injector. Preferably, the lubricant and/or the cleaning additive may be delivered to areas upstream of a fuel exit end of the injector.

The lubricant and the cleaning additive may be mixed prior to delivery to the injector. In this regard, the lubricant may incorporate the cleaning additive within its composition. Alternatively, the lubricant and the cleaning additive may be separately delivered to the injector. At least the cleaning additive may be delivered to the fuel exit end of the injector. The injector fuel exit end typically includes a valve member and a valve seat, a portion of the valve member being in sealing engagement with the valve seat when the injector is in a closed position. The lubricant and preferably also the cleaning additive may be delivered to the contact or impact area of the valve seat and the valve member. The injector may also include electromagnetic means for actuating the injector, the electromagnetic means having a movable armature and corresponding abutment means for constraining the movement of the armature. At least the lubricant may be delivered to a contact area of the armature and the abutment means. At least the lubricant may also be delivered to the sliding working surfaces of the injector.

The fuel may be in an at least substantially gaseous state or in an at least substantially vapour state by volume immediately upstream of the valve seat, at least at certain operating conditions of the engine. In this regard, it is to be noted that a reference to fuel implies a fuel or fuel/air or fuel/gas mixture which is delivered by the injector.

The lubricant and the cleaning additive may be accurately metered as a function of engine operating conditions. Separate ECU control of lubricant and/or cleaning additive delivery into the fuel injection system may be provided such that one or both are added according to known requirements and/or characteristics of the engine. For example, the addition of cleaning additive may be controlled to correspond to when the engine is operating at those points known to give potential carboning problems. Alternatively, or further to this, addition of the cleaning additive may be controlled such as to correspond with those operating points or temperatures at which it is known that addition of the additive will produce most benefit.

As noted above, the lubricant and cleaning additive may be added to the fuel upstream of the fuel injector. Preferably, the fuel injection system comprises a fuel supply means upstream of the fuel injector and lubricant is added to the fuel supply means. The fuel supply means may include a fuel pump for delivering fuel to the fuel injector. At least the lubricant may be added into a fuel supply line upstream of the fuel pump. Preferably, at least the lubricant is metered into the fuel upstream of the fuel pump. It is also envisaged that at least the lubricant may be delivered directly to a fuel tank of the fuel injection system.

Preferably, at least the lubricant may be delivered to a vapour separator of the fuel injection system upstream of the fuel injector.

Preferably, the fuel injector is a fuel delivery injector.

Alternatively, as alluded to hereinbefore, the lubricant and/or cleaning additive may be delivered directly to the fuel injector independently of the fuel supply means upstream of the fuel injector. At least the lubricant may be delivered directly to the contact area between the valve member and the valve seat. In the case of an air-assisted fuel injection system, at least the lubricant and/or the cleaning additive may alternatively be delivered to the air prior to fuel injection by the fuel injector.

In the preferred arrangement referred to above, the fuel may be delivered to the engine with the assistance of a pressurised gas. The fuel may be stored in a liquid state. Preferably, the pressurised gas is predominantly air, The fuel injection system may for example be of the type shown in the applicant's U.S. Pat. No. 4,934,329 having an initial fuel metering injector and a subsequent air delivery injector wherein the fuel is injected with and entrained with compressed gas supplied to the air delivery injector. In such a fuel injection system, at least the lubricant may be delivered either directly or indirectly to the fuel metering injector and/or the air delivery injector. In one embodiment of this arrangement, the pressurised gas may be sourced from the combustion chamber of the engine as discussed, for example, in the applicant's Australian patent application no. 65608/94.

In a further embodiment, the lubricant may be delivered into the compressed gas and the cleaning additive may be delivered into the fuel. In the case where the compressed gas is supplied by a gas compressor which incorporates seals which are lubricated, lubricant may enter the compressed gas due to contamination of the gas supply by the lubricant.

In an alternative arrangement, the fuel may be a gaseous fuel, being either a liquefied gas fuel or a compressed gas fuel. The fuel may therefore include but is not limited to liquefied petroleum gas (LPG), Butane, Propane, compressed natural gas (CNG), liquefied natural gas (LNG) or Hydrogen gas.

The valve member may preferably be of the outwardly opening "poppet" type. The portion of the valve member which sealingly engages the valve seat, typically being the valve head, may have an outwardly diverging shape, and the valve seat may have a surface which cooperates with the shape of the valve head to thereby provide the sealing engagement therebetween. The valve head may for example be hemispherical in shape. It is also envisaged that the valve member may be of a pintle type.

As alluded to hereinbefore, the valve member may be actuated by a solenoid assembly including an electric coil assembly and a moveable armature. The valve member may move together with the armature. To this end, the valve member may be secured to the armature. The movement of the armature may be delimited by at least one end stop. At least the lubricant may also be delivered to the contact or impact area between the armature and the at least one end stop. As an alternative, at least the lubricant may be delivered directly to the contact area between the armature and the at least one end stop. This may be achieved irrespective of whether lubricant and cleaning additive is being supplied to the contact area between the valve member portion and the valve seat.

The lubricant used to lubricate the fuel injector may be the same as the lubricant used to lubricate the rest of the engine.

To this end and as alluded to hereinbefore, the lubricant may incorporate the cleaning additive within its composition. This is a particularly desirable embodiment as it enables the elimination of any extra additive reservoir and/or associated supply lines and is hence essentially not noticeable by the user.

In another arrangement, the fuel injector may also or alternatively be at least partially constructed from self-lubricating and/or porous metal. That is, the fuel injector may comprise self-lubricating areas which lubricate as they wear or may be made of porous material or metal which traps and stores lubricant to reduce wear at certain areas. The contact areas of the fuel injector may therefore, for example, be self-lubricated as they wear to minimise further wear.

The fuel injector may inject directly into the combustion chamber. Alternatively, the fuel injector may inject into a prechamber in communication with the combustion chamber, the fuel injector being exposed to the pressure within the combustion chamber.

The fuel injection system may be used on a two stroke internal combustion engine. The fuel injection system may be used in an internal combustion engine which may be operating on the Otto cycle.

The provision of at least the lubricant and preferably also the cleaning additive during running of the engine to the contact area between the valve member and the valve seat helps to minimise or prevent the wear experienced in that area by reducing the frictional sliding contact therebetween and by providing a dampening of the impact load between the valve member and the valve seat due to the hydrodynamic viscous action of the lubricant. Similar comments apply to the lubrication of the contact area between the armature and an end stop or an abutment thereof.

In addition, the provision of the lubricant and particularly the cleaning additive helps to keep the exit area of the fuel injector and also the nozzle and surrounding areas of the fuel injector where applicable clear of deposits and build-up. This is also the case in regard to the fuel entry point to the fuel injector and any gas capture volume used in conjunction therewith as described in the applicant's pending Australian patent application no. 65608/94. The ratio of lubricant and additive mixed with the fuel may be varied in accordance with specific deposit control requirements.

The amount of lubricant and/or cleaning additive supplied to the fuel upstream of the fuel injector or directly to the fuel injector may be metered in dependence on the engine operating conditions. For example, when the engine is operating under conditions and/or temperatures which may lead to less stable fuel combustion, the amount of lubricant and/or cleaning additive supplied may be increased. This is because the likelihood of deposit formation typically increases in these conditions. When the engine operating conditions and/or temperatures are such that more stable fuel combustion prevails, the amount of lubricant and/or cleaning additive supplied may be reduced. The ratio of fuel to lubricant delivered to the fuel injector may be within the range of 50:1 to 500:1. The supply of lubricant and/or cleaning additive may also be discontinuous, with lubricant and/or cleaning additive being supplied under certain engine operating conditions only.

Although it is shown to supply lubricant to a diesel fuel injection nozzle in U.S. Pat. No. 4,412,657 in the name of Lucas Industries Limited, the lubricant is for the purpose of providing lubrication to sliding contact areas upstream of the discharge end of the nozzle. This is distinguishable from the present invention wherein lubrication is provided to impact areas where components of the fuel injector separate and come together during the injection process. In the above patent, the contact areas supplied with lubricant do not separate and are in sliding contact.

The invention will be more readily understood from the following description of an exemplary arrangement of the fuel injection system according to the present invention as shown in the accompanying drawings.

BRIEF DESCRIPTION OF THE DRAWINGS

FIG. 1 is a fuel injection system according to the present invention for use on a motorcycle engine; and FIG. 2 is a fuel delivery injector for use in the fuel injection system of FIG. 1.

DETAILED DESCRIPTION OF THE DRAWINGS

The method of lubricating and cleaning a fuel injector according to the present invention can be used on two stroke engines and the invention will be described in such an application. It is however to be appreciated that the method can equally be applied to other engines including four stroke cycle engines and diesel engines.

The method can be used in motorcycle applications and a system adapted for this application is shown in FIG. 1. The internal combustion engine 1 is of a two stroke type having at least one combustion chamber 2 with each combustion chamber 2 having a fuel delivery injector 3 in communication therewith for injecting fuel thereto. The fuel injector may inject into a prechamber 50 communicating with each combustion chamber 2.

A fuel supply system delivers fuel to the fuel injector 3. The fuel supply system includes a fuel tank 13, a fuel pump 12 and a fuel metering pump 11. The fuel tank 13 supplies fuel along a fuel supply line 25 to the fuel pump 12. The fuel is delivered to the metering pump 11 at a pressure greater than its vapour pressure to thereby prevent cavitation of the fuel within the metering pump 11 which may result in a loss in metering accuracy. The metering pump 11 meters fuel to the fuel delivery injector 3.

The fuel metering pump 11 is of the positive displacement type, with an electromechanical actuator 14 controlling the amount of fuel metered to the fuel delivery injector 3 at each injection event, the fuel being delivered at a relatively high pressure along an injector supply line 10. A fuel and vapour return line 15 is also provided from the fuel metering pump 11 to the fuel tank 13 to allow return of excess fuel and vapour therefrom. Alternatively, a fuel metering pump such as that described in the applicant's co-pending PCT patent application Ser. No. PCT/AU96/00404 may be used, details of which are incorporated herein by reference.

The electromechanical actuator 14 is controlled by an electronic control unit 16 powered by a vehicle power supply 17. The electronic control unit 16 obtains input signals from various sensors on the engine 1 relating to the driver demand 18, the air inlet temperature 19 and the engine speed 20 to thereby determine, amongst other things, the fuel per cycle requirement of the engine 1 and to accordingly control the fuel metering pump 11. The electronic control unit 16 also controls the driver of the fuel delivery injector 3 on the basis of the above inputs.

The engine 1 includes a mechanical lubricant pump 21 which is also controlled by the electromechanical actuator 14 under the control of the electronic control unit 16 and delivers a lubricant such as oil from a lubricant reservoir 22 to the engine 1. Lubricant is delivered from the lubricant pump 21 along an engine supply line 23 to the air intake 5 of the engine 1. It is however also envisaged that the lubricant pump 21 be of an alternative type, for example, a pneumatically actuated or electronically actuated pump.

Both the fuel metering pump 11 and the lubricant pump 21 are controlled as a function of the engine speed. The fuel pump 12 is described in more detail in the applicant's Japanese patent application no. 171332/96 whereas the fuel metering pump is described in more detail in the applicant's Australian patent application no. 28090/92. Details of these two components are incorporated herein by reference.

According to one arrangement according to the present invention, lubricant and/or cleaning additive may also be supplied to the fuel upstream of the fuel pump 12 by, for example, the lubricant pump 21 so that the lubricant and cleaning additive can be delivered by the fuel supply system to the fuel delivery injector 3. To this end, a supply line 24 connects the lubricant pump 21 to the fuel supply line 25 connecting the fuel tank 13 to the fuel pump 12. Lubricant and/or cleaning additive can then be delivered by the lubricant pump 21 to the fuel supply line 25 upstream of the fuel pump 12. During running of the engine 1, as the lubricant and/or additive must pass through a tortuous path including the fuel pump 12 and the fuel metering pump 11 before reaching the delivery injector 3, this leads to good mixing of the lubricant and/or additive with the fuel.

The above described system is particularly suited to the situation wherein the cleaning additive is mixed with the lubricant or wherein the cleaning additive is comprised in the lubricant and both are delivered to the delivery injector 3 by way of the fuel supply system upstream of the delivery injector 3. Nonetheless and as alluded to hereinbefore, other methods or systems may be employed to deliver the lubricant and the cleaning additive, whether jointly or separately, to the delivery injector 3.

For example, whilst the lubricant may be delivered to the delivery injector 3 in substantially the same way as described above, the cleaning additive may be directly delivered to the delivery injector 3 by separate means independent of the fuel supply system. Alternatively, both the lubricant and the cleaning additive may be delivered to the delivery injector 3 independent of the fuel supply system. For example, in the case where the fuel injection system is a dual fluid injection system wherein a metered quantity of fuel is delivered to the engine 1 entrained in a quantity of compressed gas, provided from a compressed air source 51 one of either the lubricant or the cleaning additive may be metered into the compressed gas prior to delivery to the engine 1 by the delivery injector 3 whilst the other may be metered directly to a particular area within the delivery injector 3. Lubricant and/or cleaning additives may also be delivered to a vapour separator 52 located upstream of the fuel injector 3.

The provision of both the lubricant and the cleaning additive to the delivery injector 3 reduces wear and deposit formation and hence results in better performance and durability of the delivery injector 3. The dispersant/detergent, properties of the cleaning additive serve to keep the injector 3. and particularly the fuel exit areas of the delivery injector 3, clean (i.e.: free from deposits). The lubricant contributes to reducing injector wear, particularly at the impact or contact areas within the injector 3, by providing hydrodynamic dampening of contact stress between, for example, the injector valve member and the valve seat, and by reducing the metal to metal sliding therebetween. Further, the presence of a film of lubricant and/or cleaning additive on the injector surfaces reduces oxidation and corrosion of the injector metal exposed in the combustion chamber 2.

It is convenient, although not essential, that the lubricant incorporates the required cleaning additive within its composition. To this end, the applicants have used an oil developed for direct injected two stroke engines incorporating an ashless dispersant/detergent additive package wherein the oil is a TCW3 or TCW2 (NMMA industrial classification) oil.

By way of example only, the blend composition of this oil may be as follows:

| | |
|---|---|
| 55% | Mineral Oil |
| 25% | Additive package |
| 19% | Mineral Spirit Solvent |
| 1% | Anti-wear agent |

The abovenoted additive packaged may include as its main constituents:

polyolefin alkene amine (succinimide dispersant)

substituted Polyolefin Phenol hindered amine saturates mono aromatics

Di aromatics/polars polyisobutane

Nonetheless, it is to be appreciated that the additive package may comprise other suitable constituents and that the lubricant may have a different blend composition. For example, the percentage composition of each element may vary from oil to oil and the anti-wear agent may be omitted altogether. Further, the additive need not be comprised in the blend composition of the lubricant and may be metered to the fuel injection system as a separate element.

FIG. 2 shows the various components of the fuel delivery injector 3 in more detail. The fuel delivery injector 3 includes a valve member 30 also known as a "poppet",the valve member 30 being movable in a direction parallel to the longitudinal axis of the fuel delivery injector 3. A portion 31 of the valve member 30 sealingly engages a valve seat 32 of the fuel delivery injector 3. The sealing and unsealing engagement of the valve member portion 31 with the valve seat 32 controls the flow of fuel from the delivery injector 3 and hence the fuel injection process.

The fuel delivery injector 3 includes a solenoid assembly 34 including a solenoid coil 35 and an armature 33 movable in a direction towards the valve seat 32 when the solenoid coil 35 is activated. The armature 33 is secured to the valve member 30 so that the valve member 30 moves together with the armature 33. When the solenoid assembly 34 is activated and the coil 35 is energised, the armature 33 moves in a direction towards the valve seat 32 until it contacts an end stop 30 provided at one end of an inner sleeve 38 of the fuel delivery injector 3. As the valve member 30 moves together with the armature 33, the end stop 36 delimits the maximum separation of the valve member portion 31 away from the valve seat 32. When the solenoid coil 35 is de-energised, a return spring 39 separates the armature 33 away from the end stop 36 in a direction away from the valve seat 32 until the valve member portion 31 re-engages the valve seat 32.

According to the present invention, lubricant and/or cleaning additive may be supplied in the fuel delivered to the fuel delivery injector 3. As the fuel exits the fuel delivery injector 3, lubrication and cleaning is provided at the contact area between the valve member portion 31 and the valve seat 32. Lubrication and/or cleaning may also be provided at the contact area between the armature 33 and the end stop 36. It is however also envisaged that lubricant and/or cleaning additive may be supplied directly to the above noted contact areas independent of the fuel supply system, To this end, passages may be provided within the fuel delivery injector 3 to deliver lubricant and/or cleaning additive directly to the contact areas. It is also envisaged that porous metals may be used in the construction of the delivery injector 3 to thereby provide contact areas which trap and store lubricant and their self lubricate as they wear. Alternatively, the injector 3 may be manufactured from self-lubricating material which releases lubricant as it wears.

The claims defining the invention are as follows:

1. A method of lubricating and/or cleaning a fuel delivery injector of an internal combustion engine during running of the engine, the injector being part of a dual fluid injection system using a compressed gas to effect injection of a liquid fuel, the liquid fuel being delivered by entrainment by the compressed gas, the method comprising promoting the delivery of at least one of a lubricant and cleaning additive by directly delivering the at least one of the lubricant and cleaning additive to the compressed gas to assure delivery of the lubricant and/or cleaning additive to the injector.

2. A method according to claim 1 wherein the lubricant and the cleaning additive are mixed together prior to delivery to the injector.

3. A method according to claim 1 wherein the cleaning additive is incorporated within the lubricant.

4. A method according to claim 3 wherein at least the cleaning additive is delivered to areas upstream of a fuel exit end of the injector.

5. A method according to claim 1, wherein the dual fluid injection system further comprises a gas capture volume in communication with at least one of a fuel metering injector and a gas delivery injector, wherein at least the cleaning additive is delivered to the gas capture volume.

6. A method according to claim 1 wherein the lubricant and/or cleaning additive is accurately metered in dependence on the engine operating conditions.

7. A method according to claim 1 wherein the internal combustion engine uses a lubricant for general lubrication of the engine and the same lubricant is delivered to the injector.

8. A method according to claim 1 wherein the cleaning additive is an ashless dispersant or detergent.

9. A method according to claim 1 wherein the injector is at least partially constructed from porous material.

10. A method according to claim 9 wherein the injector includes a valve seat made of porous material.

11. A method according to claim 1 wherein the injector is at least partially constructed from self-lubricating metal.

12. A method according to claim 1 wherein the engine is a two stoke engine.

13. A dual fluid injection system for an internal combustion engine comprising at least one fuel delivery injector comprising a valve member and a valve seat, a portion of the valve member being in sealing engagement with the valve seat when the injector is in the closed position, the flow of fuel to the engine being controlled by the sealing and unsealing engagement of the portion of the valve member with the valve seat, the dual fluid injection system further including a compressed gas supply arranged to deliver compressed gas to the fuel delivery injector whereby the compressed gas is used to effect injection of a liquid fuel, the liquid fuel being delivered by entrainment by the compressed gas, and a delivery element which delivers at least one of a lubricant and a cleaning additive directly into the compressed gas such that the lubricant and/or cleaning additive can be subsequently supplied to at least one impact area within the injector.

14. A dual fluid injection system according to claim 13 further comprising a gas capture volume in communication with the injector, and means for delivering at least one of the lubricant and the cleaning additive to the gas capture volume.

15. A direct injection system according to claim 13, wherein the valve member is of the poppet type, the portion of the valve member which sealingly engages the valve seat having an outwardly diverging shape, the valve seat having a surface for cooperating with the shape of the valve member portion to facilitate sealing engagement therebetween.

16. A direct injection system according to claim 74 wherein the valve member portion is hemispherical in shape.

17. A direct injection system according to claim 13, wherein the injector is at least partially constructed from self-lubricating metal.

18. A direct injection system according to claim 13, wherein the injector is at least partially constructed from porous material.

19. A direct injection system according to claim 18, wherein the injector includes a valve seat made of porous material.

20. A direct injection system according to claim 13 wherein the injector injects into a prechamber in communication with a combustion chamber of the engine.

21. A dual fluid injection system of an internal combustion engine comprising:

at least one fuel delivery injector having a valve member and a valve seat wherein a portion of the valve member is in sealing engagement with the valve seat when the injector is in the closed position and the flow of fuel to the engine is controlled by the sealing and unsealing engagement of the portion of the valve member with the valve seat, fuel means for supplying liquid fuel to the fuel delivery injector;

compressed gas means for supplying compressed gas to effect injection of the liquid fuel by entrainment in compressed gas; and supply means for promoting the delivery of at least one of said lubricant and said cleaning additive by directly supplying the at least one of said lubricant and said cleaning additive to the compressed gas to assure delivery of the lubricant and/or cleaning additive to at least one impact area within the injector.

* * * * *